(12) United States Patent
Wang et al.

(10) Patent No.: US 9,738,525 B2
(45) Date of Patent: Aug. 22, 2017

(54) PRODUCTION SYSTEM FOR VAPOR-GROWN CARBON NANOFIBERS

(71) Applicant: YONYU APPLIED TECHNOLOGY MATERIAL CO., LTD, Tainan (TW)

(72) Inventors: Chun-Shan Wang, Tainan (TW); Teng-Hui Wang, Tainan (TW)

(73) Assignee: YONYU APPLIED TECHNOLOGY MATERIAL CO., LTD., Tainan (TW)

( * ) Notice: Subject to any disclaimer, the term of this patent is extended or adjusted under 35 U.S.C. 154(b) by 147 days.

(21) Appl. No.: 14/749,657

(22) Filed: Jun. 25, 2015

(65) Prior Publication Data

US 2016/0236937 A1 Aug. 18, 2016

(30) Foreign Application Priority Data

Feb. 12, 2015 (CN) .................... 2015 2 0101083 U

(51) Int. Cl.
*B01J 19/18* (2006.01)
*B01J 19/24* (2006.01)
*B01J 19/26* (2006.01)
*C01B 31/02* (2006.01)
*B01J 19/02* (2006.01)
*B01J 4/00* (2006.01)

(52) U.S. Cl.
CPC .......... *C01B 31/0226* (2013.01); *B01J 4/002* (2013.01); *B01J 19/02* (2013.01); *B01J 19/18* (2013.01); *B01J 19/1812* (2013.01); *B01J 19/24* (2013.01); *B01J 19/26* (2013.01); *B01J 2219/00135* (2013.01); *B01J 2219/00245* (2013.01); *B01J 2219/0218* (2013.01); *B01J 2219/0236* (2013.01); *B01J 2219/24* (2013.01)

(58) Field of Classification Search
CPC ....... C01B 31/0226; B01J 19/18; B01J 19/24; B01J 19/26
USPC .......................... 422/187; 423/447.1, 447.3
See application file for complete search history.

(56) References Cited

U.S. PATENT DOCUMENTS

| 4,058,590 | A | * | 11/1977 | Ruble | ....................... C09C 1/50 422/150 |
| 5,858,486 | A | * | 1/1999 | Metter | ..................... C04B 35/83 117/13 |
| 6,790,426 | B1 | * | 9/2004 | Ohsaki | ................... B82Y 30/00 423/447.2 |
| 8,048,396 | B2 | * | 11/2011 | Yumura | ................ B82Y 30/00 423/447.1 |
| 2004/0241439 | A1 | * | 12/2004 | Morita | .................. B82Y 30/00 428/364 |
| 2007/0051313 | A1 | * | 3/2007 | Wang | ..................... B82Y 30/00 118/719 |
| 2012/0028116 | A1 | * | 2/2012 | Choi | ..................... H01G 11/34 429/211 |

* cited by examiner

*Primary Examiner* — Walter D Griffin
*Assistant Examiner* — Huy-Tram Nguyen
(74) *Attorney, Agent, or Firm* — CKC & Partners Co., Ltd.

(57) ABSTRACT

In a production system for vapor-grown carbon nanofibers includes a static mixer and a micro mist nozzle for preventing un-uniform input material from forming impurities, an anti-adhering coating covering an inner wall of a vertical tubular reactor for preventing a catalyst, raw material and carbon fibers from adhering to the inner wall of the vertical tubular reactor, and a sedimentation device into which a dispersant and water are inputted to separate produced carbon fiber compositions from particulate impurities in water.

4 Claims, 1 Drawing Sheet

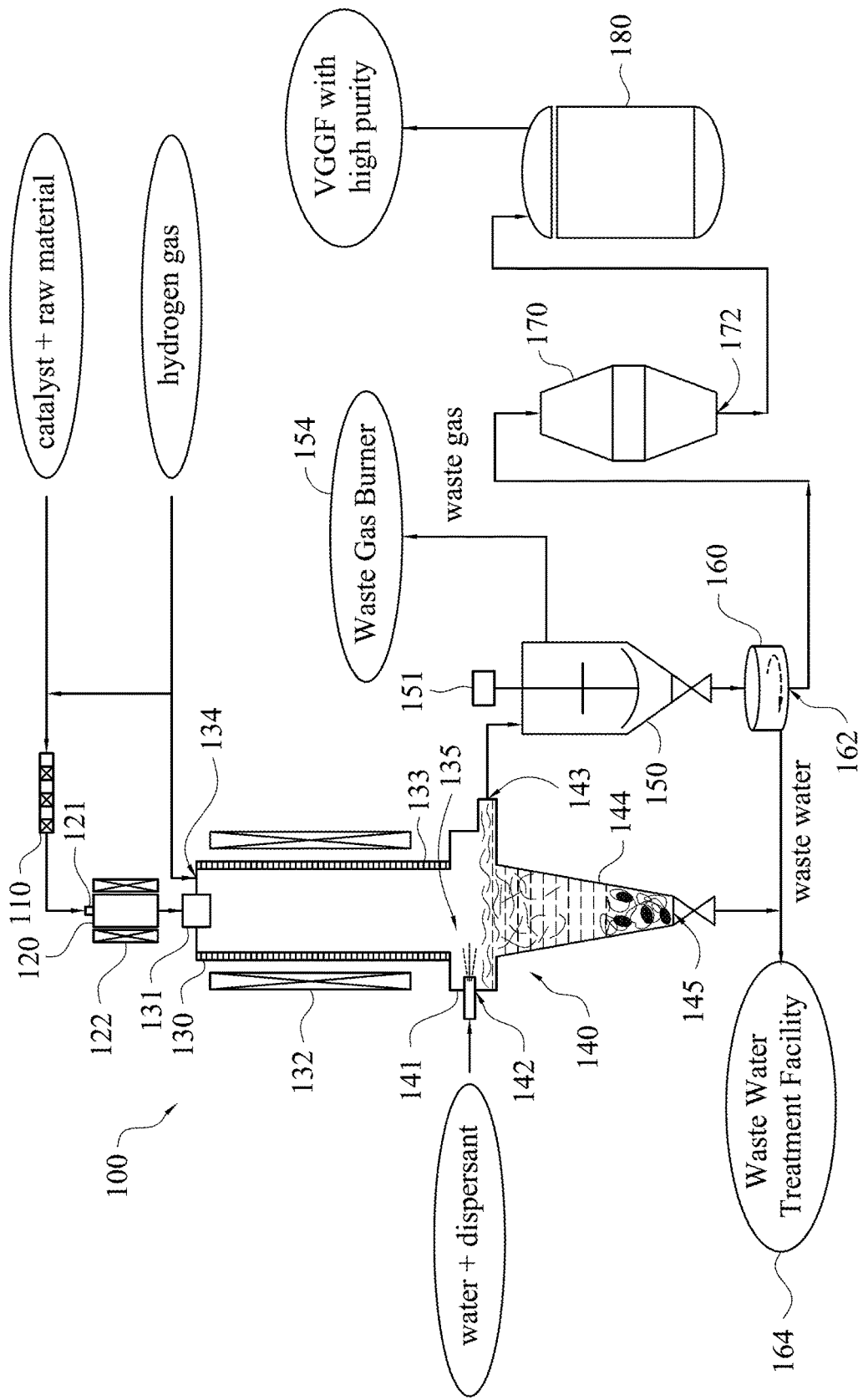

PRODUCTION SYSTEM FOR VAPOR-GROWN CARBON NANOFIBERS

RELATED APPLICATIONS

This application claims priority to China Application Serial Number 201520101083.3, filed Feb. 12, 2015, which is herein incorporated by reference.

BACKGROUND

Field of Invention

The present invention relates to a production system for vapor-grown carbon fibers (VGCF), and more particularly, to a production system for fabricating vapor-grown carbon nanofibers with high purity.

Description of Related Art

VGCF has excellent material properties of good crystal orientation, high strength, high elasticity and high corrosion resistance, a high aspect ratio, a high thermal-conductive coefficient and a low thermal-expansion coefficient. In addition, carbon fibers made by the vapor-growing method can have the structure similar to the single-crystal graphite structure, thereby forming excellent multi-wall carbon tubes having excellent electrical conductivity, wherein the thermal conductivity thereof is better than that of the thermally-conductive material such as copper or aluminum. The success of VGCF study has added quite an important product to the carbon fiber industry in which OPCF (Organic Precursor Carbon Fibers) such as PAN, Pitch carbon fibers have been the major products for quite a long time.

The VGCF production process mainly uses low boiling hydrocarbon compounds as raw material (carbon source) having pyrolysis reaction in reductive carrier gas (such as hydrogen) atmosphere, thus directly forming VGCF via the special catalysis of transition metals such as iron, nickel or cobalt in nano-particles thereof as nucleation, wherein the reaction temperature is between 800° C. and 1300° C. The VGCF fabrication process has the advantage that the fabrication skill is simple and does not need to perform the steps of spinning, pre-oxidation, carbonization, etc. required in the OPCF fabrication process, so that the VGCF fabrication process can form carbon fibers directly from cheap low-boiling hydrocarbon material via pyrolysis and catalysis.

A conventional VGCF production facility is mainly composed of a gas supplying apparatus, a reaction apparatus and a collection bin. At first, raw material gas (such as a hydrocarbon compound and a reaction catalyst) and carrier gas (such as hydrogen) enter the reaction apparatus from the gas supplying apparatus, in which a pyrolysis reaction is generated to form carbon fibers. Thereafter, the carbon fibers fall in the collection bin.

The conventional VGCF production facility has the following disadvantages: the catalyst, raw materials or carbon fibers used or produced therein are likely to adhere to an inner wall of a reaction tube of the reaction apparatus, thus forming particulate impurities or agglomerations resulting in an unsmooth flow field, or even block the reaction tube to interrupt the production; and the produced carbon fibers cannot be separated from the particulate impurities, thus causing the carbon fiber composition to include too many non-fibrous carbon impurities. The conventional VGCF contains too much non-fibrous carbon, thus decreasing the number of continuous networks to be constructed by the VGCF in the composite material to affect the performance of the composite material. Moreover, because not being highly graphitized, the conventional VGCF does not increase the performance of electrical and heat conduction as expected.

Hence, there is a need to provide a production system for vapor-grown carbon nanofibers, thereby separating carbon fibers from particulate impurities, and graphitizing the vapor-grown nanofibers, such that a VGGF (vapor-grown graphite fibers) composition with high purity is produced.

SUMMARY

An object of the present invention is to provide a production system for vapor-grown carbon nanofibers for separating carbon fibers from particulate impurities, and highly graphitizing the vapor-grown carbon nanofibers, thereby producing a VGGF (vapor-grown graphite fibers) composition with high fiber purity and high graphitization degree.

According to the aforementioned object, a production system for vapor-grown carbon nanofibers, the production system includes a preheating room, a micro mist nozzle and a static mixer, a vertical tubular reactor, an anti-adhering coating, a heater, a sedimentation device, a fiber suspension collecting device, a centrifuge, a dryer and a graphitization furnace, in which the preheating room is connected to a top of the vertical tubular reactor for heating and vaporizing raw material and a catalyst to form reaction gas. The micro mist nozzle is disposed on a top of the preheating room, and the static mixer is connected to the micro mist nozzle. The vertical tubular reactor has a reaction gas inlet, a carrier gas inlet and a product outlet, in which the reaction gas inlet and the carrier gas inlet are located on the top of the vertical tubular reactor, and the product outlet is located at a bottom of the vertical tubular reactor. The anti-adhering coating covers an inner wall of the vertical tubular reactor, and the heater is disposed adjacent to an outer wall of the vertical tubular reactor. The sedimentation device includes a product catching portion and a tapered portion. The product catching portion is connected and communicates with the vertical tubular reactor, and has a dispersant and water inlet, and a fiber suspension outlet. The tapered portion is connected and communicates with the product catching portion. The fiber suspension collecting device is connected to the fiber suspension outlet. The centrifuge is connected to the fiber suspension collecting device, and has a wet fiber outlet. The dryer is connected to the wet fiber outlet, and has a dry fiber outlet. The graphitization furnace is connected to the dryer fiber outlet.

In one embodiment, the fiber suspension collecting device further includes a stirrer.

In one embodiment, the anti-adhering coating is a boron nitride coating, an aluminum nitride coating, a gallium nitride coating or an indium nitride coating.

In view of the aforementioned embodiments, with the application of the embodiments of the present invention, a catalyst, raw material and carbon fibers can be prevented from adhering to the inner wall of the vertical tubular reactor; the carbon fibers can be effectively separated from particulate impurities; and the vapor-grown carbon nanofibers can be graphitized to become the VGGF composition, such that the fiber purity and the graphitization degree of the VGGF composition can be greatly increased to promote the performance of electrical conduction, heat conduction and strength.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a schematic diagram showing a production system for vapor-grown carbon nanofibers according to some embodiments of the present invention.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In view of the foregoing, when the conventional VGCF production facility is in production, the catalyst, raw materials or carbon fibers used or produced therein are likely to adhere to an inner wall of a reaction tube of a reaction apparatus, and thus particulate impurities or agglomerations are gradually formed to result in an unsmooth flow field, or even block the reaction tube to interrupt the production. Therefore, the present invention forms an anti-adhering coating to cover an inner wall of a vertical tubular reactor, so as to prevent a catalyst, raw material and carbon fibers from adhering to the inner wall of the vertical tubular reactor. The present invention further uses a sedimentation device into which a dispersant and water are inputted to separate the produced carbon fiber compositions from particulate impurities in water.

Referring to FIG. 1, FIG. 1 is a schematic diagram showing a production system 100 for vapor-grown carbon nanofibers according to some embodiments of the present invention. The system 100 includes a vertical tubular reactor 130, an anti-adhering coating 133, a heater 132, a sedimentation device 140, a fiber suspension collecting device 150, a centrifuge 160, a dryer 170 and a graphitization furnace 180. In some embodiments, the system further comprises a preheating room 120, a micro mist nozzle 121 and a static mixer 110. The preheating room 120 has a heating device 122 disposed thereon, and is connected to a top of the vertical tubular reactor 130. The micro mist nozzle 121 is disposed on a top of the preheating room 120, and the static mixer 110 is connected to the micro mist nozzle 121. The static mixer 110 and the micro mist nozzle 121 are used to prevent the formation of non-fibrous carbon impurities caused by non-uniform material input.

The vertical tubular reactor 130 has a reaction gas inlet 131, a carrier gas inlet 134 and a product outlet 135, in which the reaction gas inlet 131 and the carrier gas inlet 134 are located on the top of the vertical tubular reactor 130, and the product outlet 135 is located at a bottom of the vertical tubular reactor 130. The anti-adhering coating 133 covers an inner wall of the vertical tubular reactor 130. The material forming the vertical tubular reactor 130 can be such as aluminum oxide, silicon carbide, quartz, mullite or silicon nitride, etc. The inner wall of the vertical tubular reactor 130 is treated by coating a IIIa group nitride for forming the anti-adhering coating 133, in which the IIIa group nitride may be boron nitride (BN), aluminum nitride (AlN), gallium nitride (GaN) or indium nitride (InN). For example, under the reaction condition of hydrogen, boron nitride and aluminum nitride have good chemical stability and heat conductivity (thermal conductivity of 150-300 W/mK), and have an anti-stick lubricating feature. The IIIa group nitride coating treatment of the present invention first cleanses the inner wall of the vertical tubular reactor 130, and then coats a IIIa group nitride coating material or spray back and forth on the inner wall of the vertical tubular reactor 130, or applies a sputtering or a chemical vapor deposition (CVD) method to coat the IIIa group nitride coating material thereon, thereby forming a thin layer with a flat and smooth surface to reduce the amount of the catalyst, raw material and carbon fibers adhering to the inner wall of the vertical tubular reactor, thus avoiding forming particulate impurities or agglomerations resulting in an unsmooth flow field, or even block the reaction tube to interrupt the production. Therefore, in some embodiments, the anti-adhering coating 133 is a IIIa group nitride coating, such as a boron nitride (BN) coating, an aluminum nitride (AlN) coating, a gallium nitride (GaN) coating or an indium nitride (InN) coating. In other embodiments, the anti-adhering coating 133 is a boron nitride (BN) coating or an aluminum nitride (AlN) coating.

The heater 132 is disposed adjacent to an outer wall of the vertical tubular reactor 130 for increasing the temperature in the reactor. The sedimentation device 140 includes a product catching portion 141 and a tapered portion 144. The product catching portion 141 is connected and communicates with the product outlet 135 of the vertical tubular reactor 130, and has a dispersant and water inlet 142, and a fiber suspension outlet 143. The tapered portion 144 is connected and communicates with the product catching portion 141. When the vertical tubular reactor 130 produces a product with few non-fibrous carbon particles, the product can be further purified by the sedimentation device 140 to obtain highly purified VGCF in which an area ratio of the non-fibrous carbon to the fibrous VGGF measured by a scanning electron microscopy (SEM) is substantially equal to or smaller than 5%. When the raw material (reaction gas) is pyrolyzed in the vertical tubular reactor 130, the product enters the sedimentation device 140 located at the bottom of the vertical tubular reactor 130.

Water with a dispersant is injected into the sedimentation device 140 via the dispersant and water inlet 142. Because the specific gravity of the particulate impurities are greater than that of the water, the particulate impurities sink to the bottom of the tapered portion 144; and because the bulk density of the carbon fiber compositions is about 0.1 g/cm$^3$, the carbon fiber compositions are expelled from the level above the tapered portion 144 (the product catching portion 141). Thus, the sedimentation device 140 can separate the carbon fiber compositions from the particulate impurities in the water. The taper design of the tapered portion 144 can accelerate the separation of the carbon fiber compositions and the particulate impurities. The bottom of the tapered portion 144 has a discharge outlet (which can be installed with a discharge valve) for discharging waste water to a waste water treatment facility 164. In some embodiments, types of the dispersant include a polymer type dispersant such as polyvinyl pyrrolidone (PVP), a nonionic type dispersant such as dodecyl octaethylene glycolmonoether (C12EO8), and an anioic type dispersant such as sodium dodecylsulfate (SDS). For example, the polymer type dispersant PVP will adsorb on the surfaces of VGCF to form a wrapping effect for preventing carbon fiber compositions for being agglomerated again, thus achieving an excellent dispersing effect. The molecular weight of the PVP is selected from between about 200,000 and 1,000,000, and the content of the PVP in water is from about 0.5 wt % to 5 wt %.

The fiber suspension collecting device 150 is connected to the fiber suspension outlet 143. In one embodiment, the fiber suspension collecting device further includes a stirrer 151. The centrifuge 160 is connected to the fiber suspension collecting device 150, and has a wet fiber outlet 162. The dryer 170 is connected to the wet fiber outlet 160, and has a dry fiber outlet 172. The graphitization furnace 180 is connected to the dryer fiber outlet 172.

Hereinafter, a process using the production system 100 for fabricating vapor-grown carbon nanofibers is described.

At first, after a transition metal compound catalyst is dissolved in a liquid hydrocarbon compound to form a first mixture, the first mixture is delivered to an input pipeline and mixed with hydrogen gas. The first mixture and the hydrogen gas enter the static mixer 110 and are blended to form a second mixture. The second mixture is injected into the preheating room 120 via the micro mist nozzle 121, and is heated and vaporized to form reaction gas. Then, the reaction gas enters the vertical tubular reactor 130 via the reaction gas inlet 131, and meanwhile the remaining hydrogen gas enters the vertical tubular reactor 130 via the carrier gas inlet 134. After the reaction gas is reacted in the vertical tubular reactor 130, a product is produced, and enters the sedimentation device 140 for purification, such that carbon fiber compositions and particulate impurities in the product are separated in water. Thereafter, the carbon fiber compositions are introduced into the fiber suspension collecting device 150. In the fiber suspension collecting device 150, the carbon fiber compositions are stirred by the stirrer 151 and expelled to the centrifuge 160 at the same time for spinning out water, in which the waste water in the centrifuge 160 is expelled to the waste water treatment facility 164, and waste gas in an upper portion of the fiber suspension collecting device 150 is expelled to a waste gas burner 154. Then, the wet product produced by the centrifuge 160 is outputted to the dryer 170 via the wet fiber outlet 162. Thereafter, the dry product produced by the dryer 170 is outputted to the graphitization furnace 180 via the dry fiber outlet 172, and undergoes a high-temperature graphitization treatment with the temperature of about 2800-3200° C. in the graphitization furnace 180, thereby obtaining a VGGF composition with a high fiber purity. The high-temperature graphitization treatment may make the crystalline structures of the carbon fibers composition more complete and remove the impurities therein, but cannot remove the non-fibrous carbon particles therein. In the production system of the present invention, the non-fibrous carbon particles produced by reaction are separated out by the sedimentation device, thereby obtaining the VGGF composition obtained having an area ratio of the non-fibrous carbon to the fibrous VGGF which is substantially equal to or smaller than 5% measured by the SEM, a carbon content of at least 99.9 wt %, a graphitization degree of at least at least 80%, and a metal content of substantially less than 200 ppm. When a thermogravimetric analyzer (TGA) is used for analysis under test conditions including a temperature increasing rate of 10° C./min and an air flow rate ranged between 10 ml/min and 20 ml/min, a thermal decomposition onset temperature of the VGGF composition is substantially greater than 700° C.

The following application examples are used for a production system for producing a VGGF composition with a high fiber purity, and the present invention is not limited thereto. Hereinafter, the fabrication of the VGGF composition is described accompanying with FIG. 1 according to an embodiment of the present invention.

APPLICATION EXAMPLE 1

At first, a transition metal compound catalyst is dissolved in a liquid hydrocarbon compound to form a first mixture, and the first mixture is delivered to an input pipeline and mixed with hydrogen gas. The first mixture and the hydrogen gas enter the static mixer 110 and are blended to form a second mixture. The second mixture is injected into the preheating room 120 via the micro mist nozzle 121, and is heated and vaporized at the temperature of 300° C. to form reaction gas. Then, the reaction gas enters the vertical tubular reactor 130 of which an inner wall is covered by a boron nitride coating (the anti-adhering coating 133), and meanwhile the remaining hydrogen gas enters the vertical tubular reactor 130 via another pipeline on the top of the vertical tubular reactor 130. After the reaction gas is reacted in the vertical tubular reactor 130, the product produced therein enters the sedimentation device 140. Water containing a dispersant is injected into the sedimentation device 140 from the dispersant and water inlet 142 located at the upper part of the sedimentation device 140, so as to separate carbon fiber compositions from particulate impurities in the water due to the sedimentation effect. Thereafter, the carbon fiber compositions are introduced into the fiber suspension collecting device 150. In the fiber suspension collecting device 150, the carbon fiber compositions are stirred by the stirrer 151 and expelled to the centrifuge 160 at the same time for spinning out water. Then, the wet product produced by the centrifuge 160 is outputted to the dryer 170 via the wet fiber outlet 162. Thereafter, the dry product produced by the dryer 170 is outputted to the graphitization furnace 180, and undergoes a high-temperature graphitization treatment with the temperature of about 2800-3200° C. in the graphitization furnace 180, thereby obtaining a VGGF composition with a high fiber purity.

The specification and operation conditions of the vertical tubular reactor 130 are listed as follows: (1) the tubular reactor: an alumina tube of 20 cm inner diameter; 24 cm outer diameter; and 200 cm long; (2) the anti-adhering coating 133: a boron nitride coating covering the inner wall of the tubular reactor; (3) the heater 132: 1150° C. control temperature; (4) the raw material and catalyst supply system: liquid raw material formed by mixing 96 wt % xylene, 3 wt % ferrocene and 1 wt % thiophene; reaction material flow rate: 50 ml/min (at 25° C., 1 ATM; delivered to an input pipeline, blended with hydrogen gas in the static mixer 110, injected into the preheating room 120 and vaporized at the temperature of 300° C. to form reaction gas; (5) carrier gas: hydrogen; flow rates: 20 L/min (via the reaction gas inlet 131), 30 L/min (via the carrier gas inlet 134); (6) reaction time: two hours: continued until the supply of raw material gas is stopped, few deposits attached to the tube wall; (7) product treatment: injecting water containing 1 wt % PVP via the dispersant and water inlet 142; (8) the graphitization treatment: performed on the dry product under the temperature 3000° C. in argon (Ar) atmosphere. After analysis, it can be known that the VGGF composition obtained by this application example is mostly formed from fibrous VGGF, the outer diameters of the fibrous VGGF are about 50 nm-200 nm, and the averaged outer diameter thereof is about 110 nm, and the aspect ratio thereof is about 180, in which the area ratio of the non-fibrous carbon to the fibrous VGGF is about 1.6%. Other features of the VGGF composition obtained by this application example are shown in Table 1.

APPLICATION EXAMPLE 2

In this application example, the liquid raw material is formed from 96 wt % xylene, 2 wt % ferrocene and 2 wt % thiophene, and the anti-adhering coating 133 is an aluminum nitride. After reaction, the product is purified by sedimentation, dried and graphitized under the temperature 2900° C., and the other conditions are the same those of the application example 1. Other features of the VGGF composition obtained by this application example are shown in Table 1.

TABLE 1

|  |  | Application Example | |
| --- | --- | --- | --- |
|  |  | 1 | 2 |
| reaction apparatus |  | FIG. 1 | FIG. 1 |
| anti-adhering coating |  | BN | AlN |
| reaction temperature |  | 1150 | 1150 |
| hydrocarbon compound (wt %) | xylene | 96 | 96 |
| catalyst(wt %) | ferrocene | 3 | 2 |
| co-catalyst(wt %) | thiophene | 1 | 2 |
| graphitization temperature(° C.) |  | 3000 | 2900 |
| product | carbon (wt %) | 99.99 | 99.93 |
|  | degree of graphitization (%) | 91 | 83 |
|  | non-fibrous carbon/fibrous carbon (A %) | 1.6 | 2.7 |
|  | VGGF average outer diameter (nm) | 115 | 109 |
|  | thermal decomposition onset temperature (° C.) | 733 | 728 |
|  | iron content (ppm) | 23 | 55 |

It can be known from the aforementioned embodiment that, the production system of the present invention can advantageously prevent the catalyst, the raw material and the carbon fibers from adhering to the inner wall of the vertical tubular reactor; effectively separate the carbon fibers from particulate impurities, and graphitizing the vapor-grown carbon nanofibers to become the VGGF composition, thereby greatly increasing the fiber purity and the graphitization degree of the VGGF composition, thus promoting the performance of electrical conduction, heat conduction and strength.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A production system for vapor-grown carbon nanofibers, the production system comprising:
   a vertical tubular reactor having a reaction gas inlet, a carrier gas inlet and a product outlet, wherein the reaction gas inlet and the carrier gas inlet are located on a top of the vertical tubular reactor, and the product outlet is located at a bottom of the vertical tubular reactor;
   an anti-adhering coating covering an inner wall of the vertical tubular reactor;
   a heater disposed adjacent to an outer wall of the vertical tubular reactor;
   a sedimentation device, comprising:
      a product catching portion connected and communicating with the vertical tubular reactor, the product catching portion having a dispersant and water inlet, and a fiber suspension outlet; and
      a tapered portion connected and communicating with the product catching portion;
   a fiber suspension collecting device connected to the fiber suspension outlet;
   a centrifuge connected to the fiber suspension collecting device, the centrifuge having a wet fiber outlet;
   a dryer connected to the wet fiber outlet, the dryer having a dry fiber outlet; and
   a graphitization furnace connected to the dry fiber outlet.

2. The production system of claim 1, wherein the fiber suspension collecting device further comprises a stirrer.

3. The production system of claim 1, wherein the anti-adhering coating is a boron nitride coating, an aluminum nitride coating, a gallium nitride coating or an indium nitride coating.

4. The production system of claim 1, further comprising:
   a preheating room connected to the top of the vertical tubular reactor;
   a micro mist nozzle disposed on a top of the preheating room; and
   a static mixer connected to the micro mist nozzle.

* * * * *